(12) United States Patent
Mitsuhashi et al.

(10) Patent No.: US 12,449,032 B2
(45) Date of Patent: Oct. 21, 2025

(54) VEHICLE DRIVE DEVICE

(71) Applicant: AISIN CORPORATION, Aichi (JP)

(72) Inventors: Kazushige Mitsuhashi, Kariya (JP);
Mitsuhiko Kato, Kariya (JP); Takuya Watanabe, Kariya (JP); Tsubasa Deguchi, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/726,320

(22) PCT Filed: Mar. 27, 2023

(86) PCT No.: PCT/JP2023/012206
§ 371 (c)(1),
(2) Date: Jul. 2, 2024

(87) PCT Pub. No.: WO2023/190347
PCT Pub. Date: Oct. 5, 2023

(65) Prior Publication Data
US 2025/0155013 A1 May 15, 2025

(30) Foreign Application Priority Data
Mar. 31, 2022 (JP) ................................. 2022-059334

(51) Int. Cl.
*F16H 57/04* (2010.01)
*B60K 1/00* (2006.01)
(Continued)

(52) U.S. Cl.
CPC ........... *F16H 57/0471* (2013.01); *B60K 1/00* (2013.01); *B60K 17/165* (2013.01);
(Continued)

(58) Field of Classification Search
CPC .. F16H 57/0471; F16H 37/082; F16H 57/043; F16H 57/0476; F16H 57/0483;
(Continued)

(56) References Cited

U.S. PATENT DOCUMENTS

| 5,643,127 A | 7/1997 | Yoshii et al. | |
|---|---|---|---|
| 11,035,457 B2 * | 6/2021 | Hedman | F16H 57/0471 |
| 2006/0160654 A1 * | 7/2006 | Tiesler | F16H 57/0482 |
| | | | 475/331 |
| 2006/0223665 A1 | 10/2006 | Matsushita et al. | |

(Continued)

FOREIGN PATENT DOCUMENTS

| JP | H08-319810 A | 12/1996 |
|---|---|---|
| JP | 2006-214580 A | 8/2006 |

(Continued)

OTHER PUBLICATIONS

Jun. 20, 2023 International Search Report issued in International Patent Application No. PCT/JP2023/012206.

*Primary Examiner* — Roger L Pang
(74) *Attorney, Agent, or Firm* — Oliff PLC

(57) ABSTRACT

A carrier is provided with a first and a second oil passage. The first oil passage is formed so as to communicate a first side surface opening that is open to a first carrier side surface with a first outer peripheral opening that is open to an outer peripheral shaft surface, and the second oil passage is formed so as to communicate a second side surface opening that is open to a second carrier side surface with a second outer peripheral opening that is open to the outer peripheral shaft surface. A first oil receiving portion is formed so as to guide oil supplied from an inner side in a carrier radial direction to the first side surface opening, and a second oil receiving portion is formed so as to guide the oil supplied from the inner side in the carrier radial direction to the second side surface opening.

12 Claims, 5 Drawing Sheets

(51) Int. Cl.
*B60K 17/16* (2006.01)
*F16H 37/08* (2006.01)

(52) U.S. Cl.
CPC ......... *F16H 37/082* (2013.01); *F16H 57/043* (2013.01); *F16H 57/0476* (2013.01); *F16H 57/0483* (2013.01)

(58) Field of Classification Search
CPC ....... F16H 57/082; B60K 1/00; B60K 17/165; B60K 2001/001; B60K 2007/0046; B60K 2007/0092
USPC ....... 475/149, 150, 204, 338, 341, 342, 348, 475/331; 184/6.12
See application file for complete search history.

(56) References Cited

U.S. PATENT DOCUMENTS

| | | | |
|---|---|---|---|
| 2010/0267508 A1* | 10/2010 | Hvolka | F16H 3/78 |
| | | | 475/149 |
| 2014/0080658 A1* | 3/2014 | Edelmann | F16C 25/06 |
| | | | 475/331 |
| 2016/0146332 A1 | 5/2016 | Taniguchi et al. | |
| 2018/0313404 A1* | 11/2018 | Hoelzl | F16C 17/02 |
| 2024/0102544 A1* | 3/2024 | Kobayashi | B60K 1/00 |

FOREIGN PATENT DOCUMENTS

| | | |
|---|---|---|
| JP | 2006-266305 A | 10/2006 |
| JP | 2016-098986 A | 5/2016 |
| JP | 2021-095952 A | 6/2021 |
| JP | 2021-124183 A | 8/2021 |

\* cited by examiner

VEHICLE DRIVE DEVICE

TECHNICAL FIELD

The present disclosure relates to a vehicle drive device including a rotary electric machine including a rotor, a pair of output members drivingly connected to wheels, a speed reducer that reduces the speed of rotation of the rotor, and a differential gear mechanism that distributes a driving force of the rotor transmitted via the speed reducer to the pair of output members.

BACKGROUND ART

An example of such a vehicle drive device is disclosed in Japanese Unexamined Patent Application Publication No. 2021-124183 (JP 2021-124183 A) (Patent Document 1). The reference signs shown in parentheses in the section of description of the background art are those of Patent Document 1.

In the vehicle drive device disclosed in Patent Document 1, as shown in FIG. 4 of the document, an in-shaft oil passage (440) extending along an axial direction is provided inside a pinion shaft (44) of a planetary reduction gear (4). The in-shaft oil passage (440) communicates with two oil holes (442, 443) that are open on the outer peripheral surface of the pinion shaft (44). Oil discharged from these oil holes (442, 443) lubricates needle bearings (NB) that support the inner peripheral surface of a stepped pinion gear (43).

RELATED ART DOCUMENTS

Patent Documents

Patent Document 1: Japanese Unexamined Patent Application Publication No. 2021-124183 (JP 2021-124183 A)

SUMMARY OF THE DISCLOSURE

Problem to be Solved by the Disclosure

In the vehicle drive device disclosed in Patent Document 1, the oil is introduced into the in-shaft oil passage (440) from an introduction passage (441) provided at one location in the axial direction, and the oil is distributed from the in-shaft oil passage (440) to the first oil hole (442) and the second oil hole (443). In such a structure, however, for example, when the amount of oil introduced into the in-shaft oil passage (440) is insufficient, most of the oil may flow into the first oil hole (442) close to the introduction passage (441), and the amount of oil flowing into the second oil hole (443) may be insufficient. In this way, the difference in the oil flow amount between the first oil hole (442) and the second oil hole (443) may excessively increase. In such a case, lubrication may partially become insufficient, which may result in a shortened life of the needle bearings (NB).

Therefore, it is desirable to realize a vehicle drive device that can easily supply a necessary amount of oil appropriately to planetary bearings that support planetary gears.

Means for Solving the Problem

As a characteristic configuration of a vehicle drive device in view of the above, the vehicle drive device includes:
a shaft member to which a driving force of a drive source is input; and
a speed reducer that reduces a speed of rotation of the shaft member and outputs the rotation to an output member drivingly connected to a wheel, in which
the speed reducer is a planetary gear mechanism including
a planetary gear including a first gear portion and a second gear portion, and a carrier that rotatably supports the planetary gear,
assuming that a direction along a rotation axis of the carrier is an axial direction, one side in the axial direction is a first axial side, the other side in the axial direction is a second axial side, a direction orthogonal to the rotation axis of the carrier is a carrier radial direction, and a direction orthogonal to a rotation axis of the planetary gear is a planetary radial direction,
the first gear portion and the second gear portion are disposed side by side in the axial direction,
the carrier includes a support shaft disposed so as to extend in the axial direction through an inner side of the planetary gear in the planetary radial direction, a first oil receiving portion, and a second oil receiving portion,
a planetary bearing is disposed between an outer peripheral shaft surface that is an outer peripheral surface of the support shaft and an inner peripheral gear surface that is an inner peripheral surface of the planetary gear,
the carrier is provided with a first oil passage and a second oil passage,
the first gear portion is disposed on the first axial side of the second gear portion,
the first oil passage is formed so as to communicate a first side surface opening that is open to a first carrier side surface that is a side surface of the carrier oriented to the first axial side with a first outer peripheral opening that is open to the outer peripheral shaft surface,
the first outer peripheral opening is disposed so as to overlap the first gear portion in a planetary radial view along the planetary radial direction,
the second oil passage is formed so as to communicate a second side surface opening that is open to a second carrier side surface that is a side surface of the carrier oriented to the second axial side with a second outer peripheral opening that is open to the outer peripheral shaft surface on the second axial side of the first outer peripheral opening,
the second outer peripheral opening is disposed so as to overlap the second gear portion in the planetary radial view,
the first oil receiving portion is provided so as to protrude from the first carrier side surface to the first axial side, and is formed so as to guide oil supplied from an inner side in the carrier radial direction to the first side surface opening, and
the second oil receiving portion is provided so as to protrude from the second carrier side surface to the second axial side, and is formed so as to guide the oil supplied from the inner side in the carrier radial direction to the second side surface opening.

In this configuration, the first oil passage is supplied with the oil guided from the first oil receiving portion provided on the first carrier side surface to the first side surface opening, and the second oil passage is supplied with the oil guided from the second oil receiving portion provided on the second carrier side surface to the second side surface opening. The oil introduced into the first oil passage is supplied to the first outer peripheral opening, and the oil introduced into the second oil passage is supplied to the second outer peripheral opening. With this configuration, the oil can be received by both the first oil receiving portion and the second oil receiving portion and supplied to the outer peripheral shaft surface. Therefore, a necessary amount of oil can be secured easily and the imbalance in the amount of oil supplied to the first outer peripheral opening and the second outer peripheral opening can be reduced easily. Thus, the planetary bearing can be lubricated appropriately. With this configuration, the inner peripheral surface of the first gear portion can appropriately be lubricated with the oil discharged from the first outer peripheral opening. The inner peripheral surface of the second gear portion can appropriately be lubricated with the oil discharged from the second outer peripheral opening.

Further features and advantages of the technology according to the present disclosure will become more apparent from the following description of illustrative, non-limiting embodiments that will be given with reference to the drawings.

MODES FOR CARRYING OUT THE DISCLOSURE

Hereinafter, a vehicle drive device 100 according to an embodiment will be described with reference to the drawings.

Figure 1:
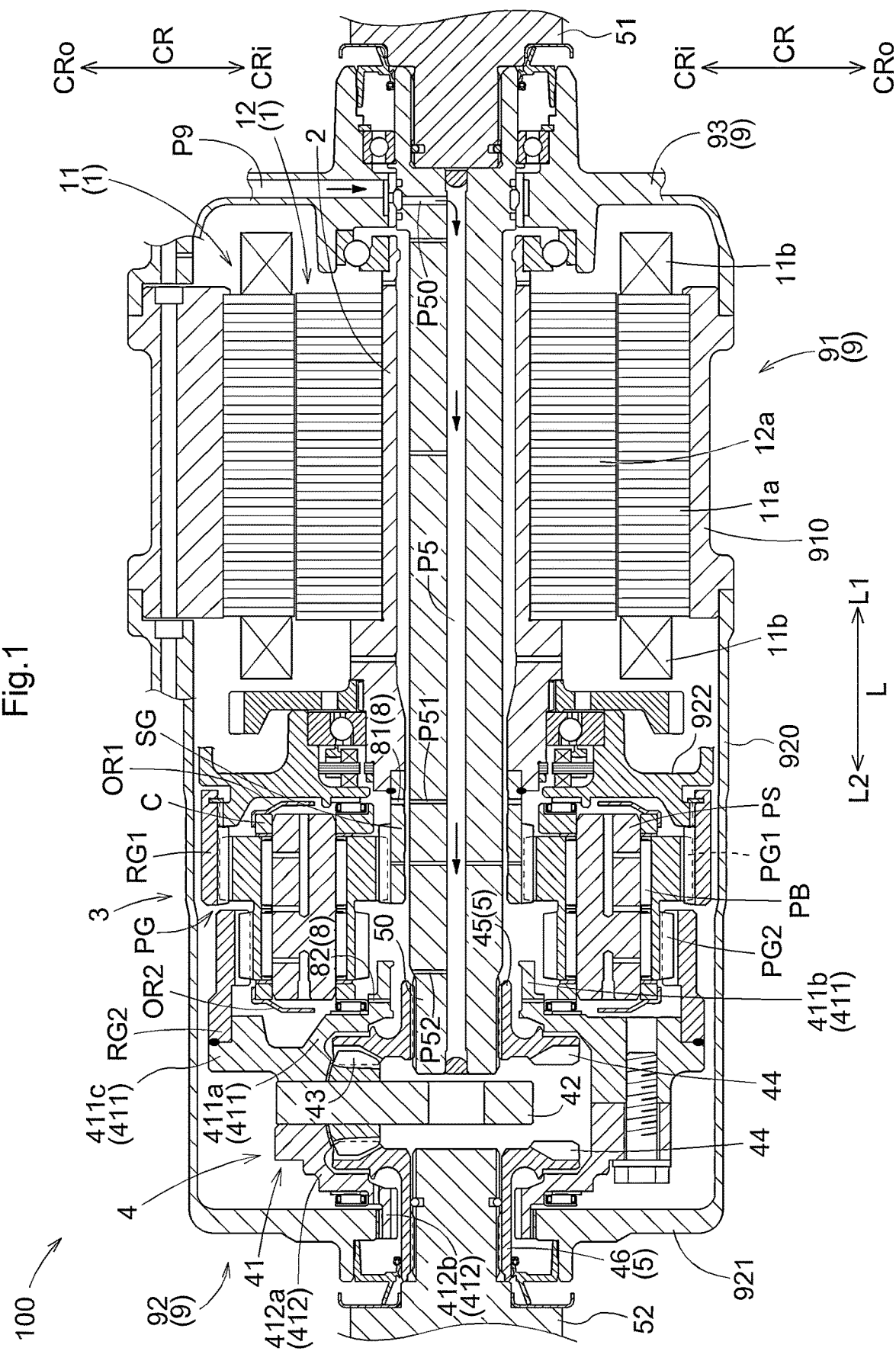
FIG. 1 is a sectional view taken along an axial direction of a vehicle drive device according to an embodiment.
Figure 2:
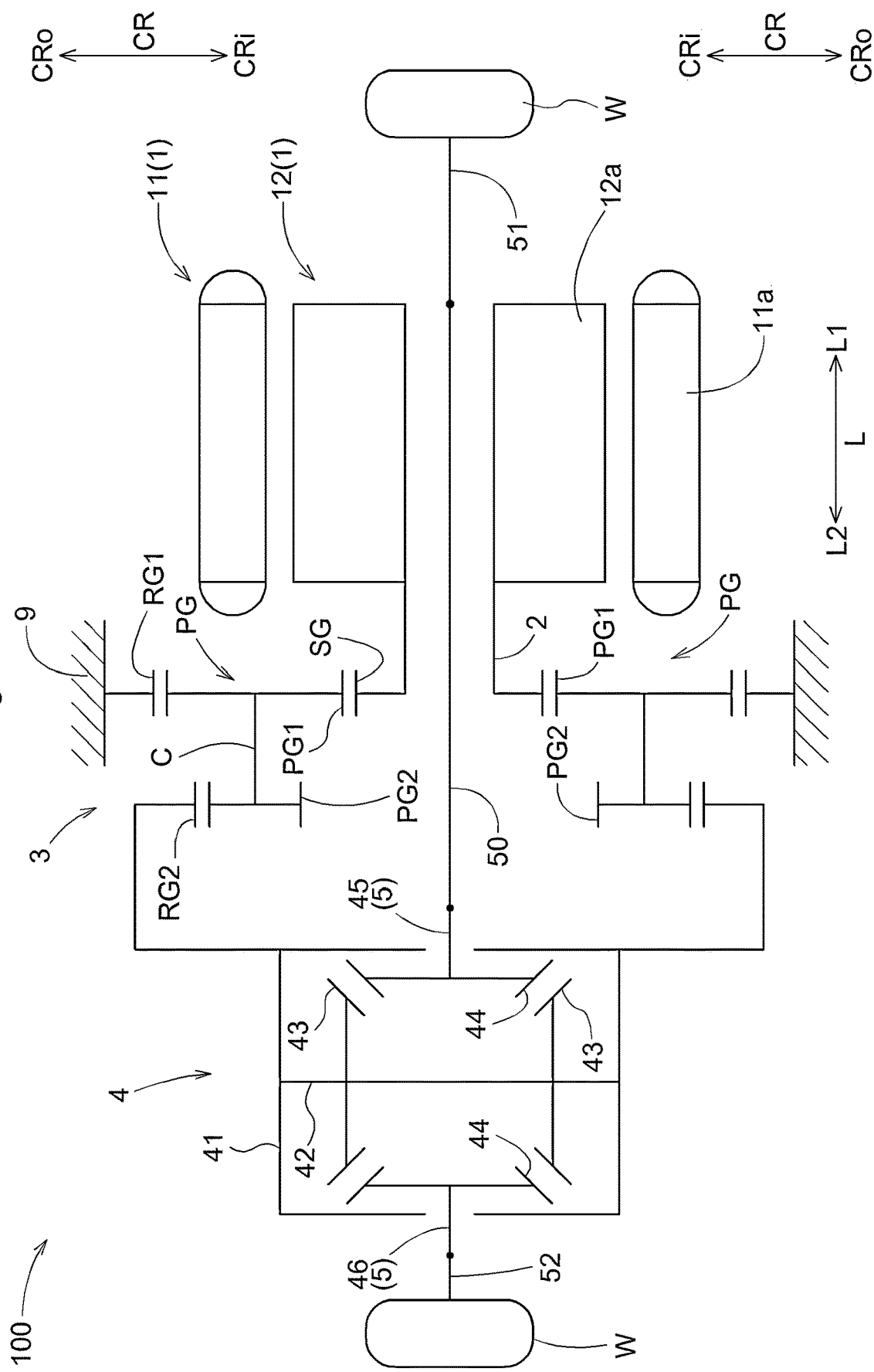
FIG. 2 is a skeleton diagram of the vehicle drive device according to the embodiment.

As shown in FIGS. 1 and 2, the vehicle drive device 100 includes a shaft member 2 to which a driving force of a drive source is input, and a speed reducer 3 that reduces the speed of rotation of the shaft member 2 and outputs the rotation to output members 5 drivingly connected to wheels W. In the present embodiment, the drive source is a rotary electric machine 1 including a rotor 12 that rotates integrally with the shaft member 2. In the present embodiment, a pair of output members 5 is provided, and the vehicle drive device 100 includes a differential gear mechanism 4 that distributes the driving force of the rotor 12 transmitted via the speed reducer 3 to the pair of output members 5. The pair of output members 5 is drivingly connected to the wheels W.

In the present application, the "rotary electric machine" is used as a concept including any of a motor (electric motor), a generator (power generator), and a motor generator that functions as both a motor and a generator if necessary.

In the present application, "drivingly connected" refers to a state in which two rotary elements are connected so that a driving force can be transmitted, and includes a state in which the two rotary elements are connected so as to rotate integrally or a state in which the two rotary elements are connected so that a driving force can be transmitted via one, two, or more transmission members. Such transmission members include various members that transmit rotation at the same speed or at a shifted speed, such as a shaft, a gear mechanism, a belt, and a chain. The transmission members may include an engagement device that selectively transmits rotation and a driving force, such as a friction engagement device and an intermesh engagement device. When "drivingly connected" is used for rotary elements in a planetary gear mechanism, it refers to a state in which the rotary elements are connected to each other via no other rotary elements.

The speed reducer 3 is a planetary gear mechanism including planetary gears PG including first gear portions PG1 and second gear portions PG2, and a carrier C that rotatably supports the planetary gears PG. The speed reducer 3 changes the speed of rotation of the shaft member 2. The differential gear mechanism 4 distributes the driving force transmitted from the rotary electric machine 1 via the speed reducer 3 to the pair of wheels W.

The speed reducer 3 and the differential gear mechanism 4 are disposed coaxially. In the present embodiment, the rotor 12, the speed reducer 3, and the differential gear mechanism 4 are disposed coaxially. More specifically, the rotor 12, the speed reducer 3, and the differential gear mechanism 4 are disposed in the stated order from a first axial side L1 to a second axial side L2.

In the following description, a direction along a rotation axis CA of the carrier C (hereinafter referred to as "carrier axis CA") will be referred to as "axial direction L". One side in the axial direction L will be referred to as "first axial side L1" and the other side in the axial direction L will be referred to as "second axial side L2". A direction orthogonal to the carrier axis CA will be referred to as "carrier radial direction CR". An outer side in the carrier radial direction CR will be referred to as "carrier radially outer side CRo", and an inner side in the carrier radial direction CR will be referred to as "carrier radially inner side CRi". A direction orthogonal to a rotation axis PA of the planetary gear PG (hereinafter referred to as "planetary axis PA") will be referred to as "planetary radial direction PR".

A direction about the planetary axis PA will be referred to as "planetary circumferential direction PC".

In the present embodiment, the vehicle drive device 100 includes a case 9. The case 9 houses the rotary electric machine 1, the shaft member 2, the speed reducer 3, and the differential gear mechanism 4.

As shown in FIG. 1, the case 9 includes a first case portion 91, a second case portion 92, and a cover portion 93 in the present embodiment. In the present embodiment, the case 9 corresponds to a "non-rotary member".

The first case portion 91 includes a first peripheral wall portion 910. The first peripheral wall portion 910 has a tubular shape that covers the rotary electric machine 1 from the carrier radially outer side CRo.

The second case portion 92 includes a second peripheral wall portion 920, a second side wall portion 921, and a partition wall portion 922.

The second peripheral wall portion 920 has a tubular shape that covers the speed reducer 3 and the differential gear mechanism 4 from the carrier radially outer side CRo. The second side wall portion 921 is formed so as to extend from the second peripheral wall portion 920 to the carrier radially inner side CRi. In the present embodiment, the second side wall portion 921 is formed integrally with the second peripheral wall portion 920 so as to close an opening of the second peripheral wall portion 920 on the second axial side L2. The second peripheral wall portion 920 is joined to the first peripheral wall portion 910 from the second axial side L2.

The partition wall portion 922 is disposed so as to separate a disposition area of the rotary electric machine 1 and a disposition area of the speed reducer 3 and the differential gear mechanism 4 in the axial direction L. In the present embodiment, the partition wall portion 922 is disposed between the rotary electric machine 1 and the speed reducer 3 in the axial direction L. The partition wall portion 922 is fixed to the second peripheral wall portion 920.

The cover portion 93 is formed so as to cover the first axial side L1 of the rotary electric machine 1. In the present embodiment, the cover portion 93 is joined to the first peripheral wall portion 910 from the first axial side L1 so as to close an opening of the first peripheral wall portion 910 on the first axial side L1.

The rotary electric machine 1 includes a stator 11 and the rotor 12. The stator 11 includes a cylindrical stator core 11a. The stator core 11a is fixed to a non-rotary member. In the present embodiment, the stator core 11a is fixed to the first peripheral wall portion 910 of the case 9 that is the non-rotary member. The rotor 12 includes a cylindrical rotor core 12a. The rotor core 12a is supported so as to be rotatable relative to the stator core 11a.

In the present embodiment, the rotary electric machine 1 is an inner rotor type rotary electric machine. Therefore, the rotor core 12a is disposed on the carrier radially inner side CRi of the stator core 11a.

In the present embodiment, the rotary electric machine 1 is a revolving field type rotary electric machine. Therefore, the stator 11 further includes a stator coil 11b. Although illustration is omitted, the rotor core 12a is provided with permanent magnets.

The shaft member 2 is connected to the rotor 12 so as to rotate integrally with the rotor 12. In the present embodiment, the shaft member 2 has a tubular shape with an axis along the axial direction L. The shaft member 2 is disposed on the carrier radially inner side CRi of the rotor core 12a so as to be coaxial with the rotor core 12a.

In the present embodiment, the shaft member 2 is disposed so as to protrude from the rotor core 12a to both sides in the axial direction L. A portion of the shaft member 2 that protrudes from the rotor core 12a to the first axial side L1 is supported so as to be rotatable relative to the cover portion 93 of the case 9. A portion of the shaft member 2 that protrudes from the rotor core 12a to the second axial side L2 is disposed so as to extend through the partition wall portion 922 of the case 9 in the axial direction L, and is supported so as to be rotatable relative to the partition wall portion 922. In the present embodiment, the shaft member 2 is disposed so as to extend through the carrier radially inner side CRi of the speed reducer 3 in the axial direction L.

Figure 3:
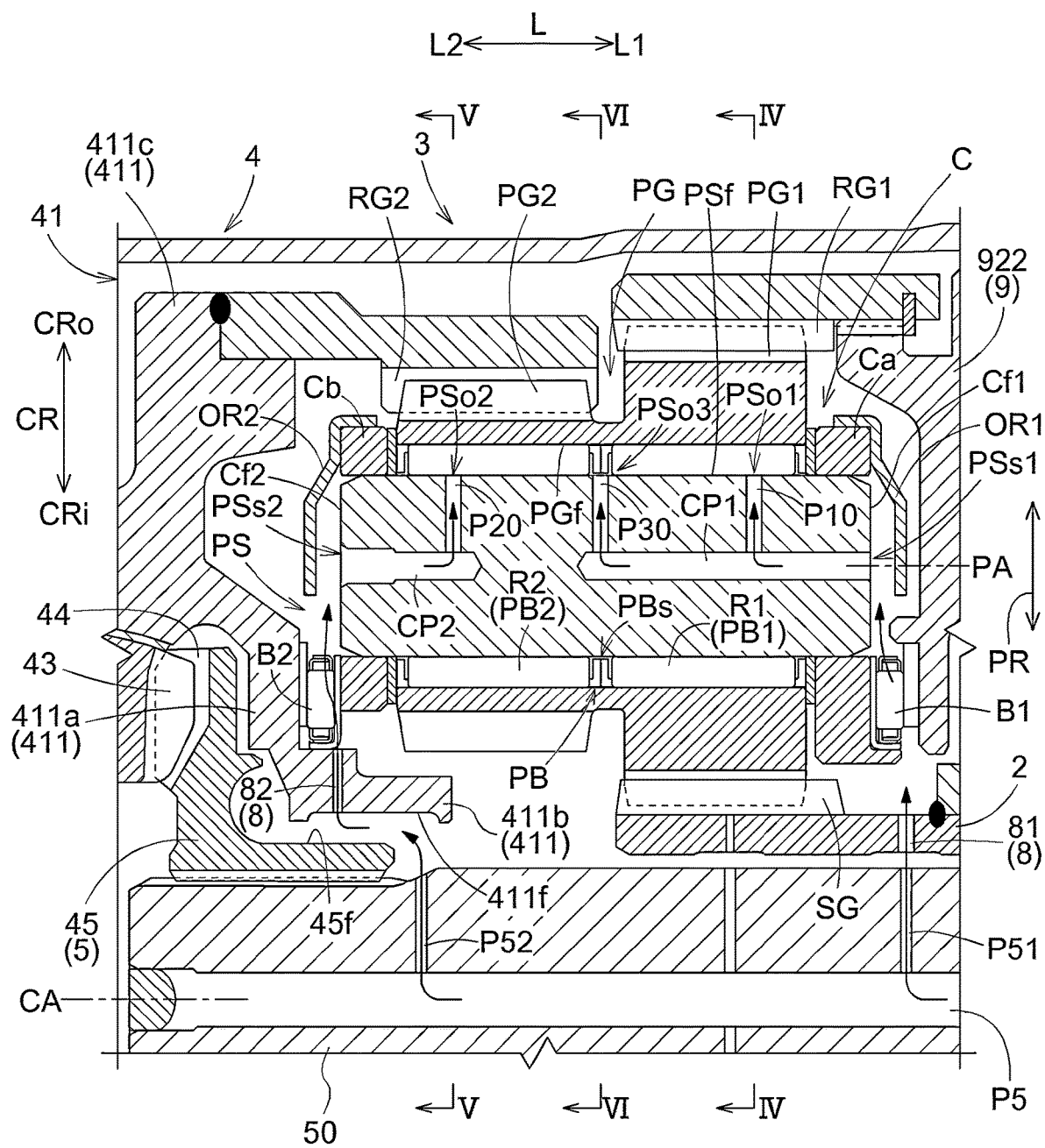
FIG. 3 is a partially enlarged sectional view taken along the axial direction of the vehicle drive device according to the embodiment.

As shown in FIG. 3, the speed reducer 3 includes the planetary gears PG including the first gear portions PG1 and the second gear portions PG2, and the carrier C that rotatably supports the planetary gears PG. In the present embodiment, the speed reducer 3 includes a sun gear SG that meshes with the first gear portions PG1, a first ring gear RG1 that meshes with the first gear portions PG1, and a second ring gear RG2 that meshes with the second gear portions PG2.

The first gear portions PG1 and the second gear portions PG2 are disposed side by side in the axial direction L. Specifically, the first gear portions PG1 are disposed on the first axial side L1 of the second gear portions PG2. Conversely, the second gear portions PG2 are disposed on the second axial side L2 of the first gear portions PG1. In the present embodiment, the first gear portion PG1 has a larger diameter than the second gear portion PG2. Conversely, the second gear portion PG2 has a smaller diameter than the first gear portion PG1.

The carrier C includes a support shaft PS disposed so as to extend in the axial direction L through the inner side of the planetary gear PG in the planetary radial direction PR. The support shaft PS rotatably supports the planetary gear PG.

In the present embodiment, the carrier C includes a first supported portion Ca disposed on the first axial side L1 of the first gear portion PG1, and a second supported portion Cb disposed on the second axial side L2 of the second gear portion PG2. Although details will be described later, the first supported portion Ca is provided with a first oil receiving portion OR1 that receives oil supplied from the carrier radially inner side CRi. The second supported portion Cb is provided with a second oil receiving portion OR2 that receives oil supplied from the carrier radially inner side CRi. That is, the carrier C includes the first oil receiving portion OR1 and the second oil receiving portion OR2.

The first supported portion Ca is supported so as to be rotatable relative to the case 9 via a first bearing B1. The first bearing B1 is a thrust bearing disposed between the first supported portion Ca and the case 9 in the axial direction L. In the present embodiment, the first bearing B1 is disposed between a portion of the first supported portion Ca that is positioned on the carrier radially inner side CRi of the support shaft PS and the partition wall portion 922 of the case 9 in the axial direction L. In the present embodiment, the first supported portion Ca supports a portion of the support shaft PS that protrudes to the first axial side L1 from the first gear portion PG1.

The second supported portion Cb is supported so as to be rotatable relative to part of the differential gear mechanism 4 (in this example, a differential case 41 described later) via a second bearing B2. The second bearing B2 is a thrust bearing disposed between the second supported portion Cb and the differential case 41 in the axial direction L. In the present embodiment, the second bearing B2 is disposed between a portion of the second supported portion Cb that is positioned on the carrier radially inner side CRi of the support shaft PS and a first support portion 411 of the differential case 41 described later in the axial direction L. In the present embodiment, the second supported portion Cb supports a portion of the support shaft PS that protrudes to the second axial side L2 from the second gear portion PG2.

A planetary bearing PB is disposed between an outer peripheral shaft surface PSf that is the outer peripheral surface of the support shaft PS and an inner peripheral gear surface PGf that is the inner peripheral surface of the planetary gear PG. In the present embodiment, the planetary bearing PB includes a first rolling portion PB1 including a plurality of first rolling elements R1, a second rolling portion PB2 disposed on the second axial side L2 of the first rolling portion PB1 and including a plurality of second rolling elements R2, and a support frame PBs that supports the first rolling portion PB1 and the second rolling portion PB2 (see FIGS. 4 and 5 as well). For example, the planetary bearing PB is structured by using a needle bearing.

The sun gear SG is connected to the rotor 12 (see FIG. 1) so as to rotate integrally with the rotor 12.

In the present embodiment, the sun gear SG is integrally connected to the shaft member 2, and rotates integrally with the rotor 12 and the shaft member 2.

The first ring gear RG1 is fixed to the case 9 that is the non-rotary member. In the present embodiment, the first ring gear RG1 is fixed to the partition wall portion 922 of the case 9.

The second ring gear RG2 is connected to an input element of the differential gear mechanism 4. In the present embodiment, the second ring gear RG2 is connected to a connecting portion 411c of the differential case 41 described later.

As shown in FIG. 1, the differential gear mechanism 4 includes the differential case 41, differential shaft members 42, input bevel gears 43, a pair of output bevel gears 44, a first output member 45, and a second output member 46. The first output member 45 is the output member 5 on the first axial side L1 out of the pair of output members 5, and the second output member 46 is the output member 5 on the second axial side L2 out of the pair of output members 5. That is, in the present embodiment, the pair of output members 5 is components of the differential gear mechanism 4.

The differential shaft member 42 is disposed so as to extend along the carrier radial direction CR. The differential shaft member 42 is supported by the differential case 41 so as to rotate integrally with the differential case 41. In the present embodiment, a plurality of differential shaft members 42 is disposed in a distributed manner in the circumferential direction so as to extend along the carrier radial direction CR (e.g., four differential shaft members 42 are disposed in a cross shape when viewed in the axial direction L along the axial direction L).

The input bevel gear 43 is rotatably supported by the differential shaft member 42. The input bevel gear 43 is rotatable (spinnable) about the differential shaft member 42 and rotatable (revolvable) about the rotation axis of the differential case 41. In the present embodiment, the input bevel gears 43 are attached to the plurality of differential shaft members 42.

The pair of output bevel gears 44 meshes with the input bevel gears 43. The pair of output bevel gears 44 is disposed separately on both sides of the differential shaft members 42 in the axial direction L.

In the present embodiment, the first output member 45 is a tubular member formed integrally with the output bevel gear 44 disposed on the first axial side L1 out of the pair of output bevel gears 44.

In the present embodiment, the second output member 46 is a tubular member formed integrally with the output bevel gear 44 disposed on the second axial side L2 out of the pair of output bevel gears 44.

In the present embodiment, the first output member 45 is connected to a first drive shaft 51 so as to rotate integrally with the first drive shaft 51, and the second output member 46 is connected to a second drive shaft 52 so as to rotate integrally with the second drive shaft 52. In this example, the first output member 45 is disposed so as to cover the outer periphery of an output shaft 50, and is spline-engaged with the output shaft 50. The output shaft 50 is connected (in this case, spline-engaged) to the first drive shaft 51 at an end on the first axial side L1 so as to rotate integrally with the first drive shaft 51. The second output member 46 is connected to the second drive shaft 52 without intermediation of the output shaft 50 so as to rotate integrally with the second drive shaft 52. Specifically, the second output member 46 is disposed so as to cover the outer periphery of the second drive shaft 52, and is spline-engaged with the second drive shaft 52. The first drive shaft 51 and the second drive shaft 52 are drivingly connected to the wheels W (see FIG. 2). Specifically, the first drive shaft 51 is drivingly connected to the wheel W on the first axial side L1, and the second drive shaft 52 is drivingly connected to the wheel W on the second axial side L2.

In the present embodiment, the output shaft 50 is disposed so as to extend through the carrier radially inner side CRi of the sun gear SG of the speed reducer 3 and the shaft member 2 in the axial direction L. The output shaft 50 extends through the cover portion 93 of the case 9 in the axial direction L, and is supported so as to be rotatable relative to the cover portion 93. A portion of the output shaft 50 that extends through the cover portion 93 has a cylindrical shape so as to cover the outer periphery of the first drive shaft 51, and is spline-engaged with the first drive shaft 51.

The differential case 41 includes the first support portion 411 that supports the output bevel gear 44 disposed on the first axial side L1 out of the pair of output bevel gears 44 from the first axial side L1, and a second support portion 412 that supports the output bevel gear 44 disposed on the second axial side L2 out of the pair of output bevel gears 44 from the second axial side L2.

In the present embodiment, the first support portion 411 includes a radial extending portion 411a extending along the carrier radial direction CR, and an axial extending portion 411b extending to the first axial side L1 from the end of the radial extending portion 411a on the carrier radially inner side CRi.

The radial extending portion 411a of the first support portion 411 is a portion that supports the output bevel gear 44 disposed on the first axial side L1 out of the pair of output bevel gears 44 from the first axial side L1. In the present embodiment, the radial extending portion 411a of the first support portion 411 is provided with the connecting portion 411c connected to the second ring gear RG2. In this example, the connecting portion 411c is formed at the end of the radial extending portion 411a of the first support portion 411 on the carrier radially outer side CRo.

The axial extending portion 411b of the first support portion 411 has a tubular first inner peripheral surface 411f (see FIG. 3). The first inner peripheral surface 411f faces a first outer peripheral surface 45f that is the outer peripheral surface of the first output member 45 from the carrier radially outer side CRo.

In the present embodiment, the second support portion 412 includes a radial extending portion 412a extending along the carrier radial direction CR, and an axial extending portion 412b extending to the second axial side L2 from the end of the radial extending portion 412a on the carrier radially inner side CRi.

The radial extending portion 412a of the second support portion 412 is a portion that supports the output bevel gear 44 disposed on the second axial side L2 out of the pair of output bevel gears 44 from the second axial side L2.

The axial extending portion 412b of the second support portion 412 has a tubular shape along the axial direction L.

The axial extending portion 412b of the second support portion 412 faces the outer peripheral surface of the second output member 46 from the carrier radially outer side CRo.

The vehicle drive device 100 includes an oil supply system for supplying oil to each part. The oil thus supplied is used to lubricate or cool each part of the vehicle drive device 100.

As shown in FIG. 1, in the present embodiment, the vehicle drive device 100 includes an in-case oil passage P9 formed so as to extend inside the case 9 (more specifically, the cover portion 93) in the carrier radial direction CR, and an in-shaft oil passage P5 formed so as to extend inside the output shaft 50 in the axial direction L. The in-case oil passage P9 communicates with the in-shaft oil passage P5 via a connecting oil passage P50 formed in the output shaft 50. Oil is supplied to the in-case oil passage P9 by an oil pump (not shown). The oil supplied to the in-case oil passage P9 is introduced into the in-shaft oil passage P5 via the connecting oil passage P50, and flows through the in-shaft oil passage P5 to the second axial side L2.

In the present embodiment, the output shaft 50 has at least a first in-shaft branched oil passage P51 and a second in-shaft branched oil passage P52 for supplying oil to the speed reducer 3. The first in-shaft branched oil passage P51 and the second in-shaft branched oil passage P52 are provided in the disposition area of the speed reducer 3 in the axial direction L, and are formed so as to branch off from the in-shaft oil passage P5 to the carrier radially outer side CRo. In this example, the first in-shaft branched oil passage P51 is disposed on the first axial side L1 of the second in-shaft branched oil passage P52. The second in-shaft branched oil passage P52 is disposed on the second axial side L2 of the first in-shaft branched oil passage P51. Although detailed description is omitted, in addition to the first in-shaft branched oil passage P51 and the second in-shaft branched oil passage P52, the output shaft 50 has oil passages for supplying oil to various locations in the vehicle drive device 100 where oil is necessary (e.g., the rotary electric machine 1).

In the present embodiment, the vehicle drive device 100 includes an oil supply portion 8 that supplies oil from the in-shaft oil passage P5 to the speed reducer 3. The oil supply portion 8 includes a first supply portion 81 that supplies oil from the carrier radially inner side CRi to the first oil receiving portion OR1 of the carrier C, and a second supply portion 82 that supplies oil from the carrier radially inner side CRi to the second oil receiving portion OR2 of the carrier C.

In the present embodiment, the first supply portion 81 is provided in the shaft member 2. The first supply portion 81 is formed so as to extend through the shaft member 2 in the carrier radial direction CR. In this example, the oil discharged from the first in-shaft branched oil passage P51 is mainly introduced into the first supply portion 81 from the carrier radially inner side CRi. The oil introduced into the first supply portion 81 is discharged to the carrier radially outer side CRo of the first supply portion 81, and is supplied to the first axial side L1 of the carrier C. This oil is supplied to the first oil receiving portion OR1 of the carrier C.

In the present embodiment, the second supply portion 82 is provided in the differential gear mechanism 4. The second supply portion 82 is formed so as to extend in the carrier radial direction CR through the first support portion 411 of the differential gear mechanism 4, specifically, the axial extending portion 411b of the first support portion 411. In this example, the oil discharged from the second in-shaft branched oil passage P52 is mainly introduced into the second supply portion 82 from the carrier radially inner side CRi. The oil introduced into the second supply portion 82 is discharged to the carrier radially outer side CRo of the second supply portion 82, and is supplied to the second axial side L2 of the carrier C. This oil is supplied to the second oil receiving portion OR2 of the carrier C.

As described above, in the present embodiment,
the rotor 12, the speed reducer 3, and the differential gear mechanism 4 are disposed coaxially,
the rotor 12, the speed reducer 3, and the differential gear mechanism 4 are disposed in the stated order from the first axial side L1 to the second axial side L2,
the vehicle drive device 100 includes:
the shaft member 2 disposed so as to extend in the axial direction L through the inner side CRi of the speed reducer 3 in the carrier radial direction CR;
the first supply portion 81 that supplies the oil to the first oil receiving portion OR1 from the inner side CRi in the carrier radial direction CR; and
the second supply portion 82 that supplies the oil to the second oil receiving portion OR2 from the inner side CRi in the carrier radial direction CR,
the first supply portion 81 is provided in the shaft member 2, and
the second supply portion 82 is provided in the differential gear mechanism 4.

With this configuration, the oil can appropriately be supplied to the first oil receiving portion OR1 and the second oil receiving portion OR2.

As shown in FIG. 3, the carrier C is provided with a first oil passage CP1 and a second oil passage CP2. Specifically, the support shaft PS of the carrier C is provided with the first oil passage CP1 and the second oil passage CP2.

The first oil passage CP1 is formed so as to communicate a first side surface opening PSs1 that is open to a first carrier side surface Cf1 that is the side surface of the carrier C oriented to the first axial side L1 with a first outer peripheral opening PSo1 that is open to the outer peripheral shaft surface PSf. In the present embodiment, the first oil passage CP1 is formed so as to extend along the axial direction L. More specifically, the first oil passage CP1 is formed so as to extend along the axis of the support shaft PS (planetary axis PA).

In the present embodiment, the carrier C is provided with a first branched oil passage P10 that branches off from the first oil passage CP1 outward in the planetary radial direction PR. The first branched oil passage P10 communicates the first oil passage CP1 with the first outer peripheral opening PSo1. Therefore, in this example, the first oil passage CP1 communicates the first side surface opening PSs1 with the first outer peripheral opening PSo1 via the first branched oil passage P10.

The first oil receiving portion OR1 described above is provided so as to protrude from the first carrier side surface Cf1 to the first axial side L1, and is formed so as to guide the oil supplied from the carrier radially inner side CRi to the first side surface opening PSs1. Thus, the oil guided to the first side surface opening PSs1 by the first oil receiving portion OR1 flows through the first oil passage CP1 and the first branched oil passage P10, and is discharged from the first outer peripheral opening PSo1 to the outer side of the outer peripheral shaft surface PSf.

The second oil passage CP2 is formed so as to communicate a second side surface opening PSs2 that is open to a second carrier side surface Cf2 that is the side surface of the carrier C oriented to the second axial side L2 with a second outer peripheral opening PSo2 that is open to the outer peripheral shaft surface PSf on the second axial side L2 of the first outer peripheral opening PSo1. In the present embodiment, the second oil passage CP2 is formed so as to extend along the axial direction L. More specifically, the second oil passage CP2 is formed so as to extend along the axis of the support shaft PS (planetary axis PA). In the present embodiment, the first oil passage CP1 and the second oil passage CP2 are disposed so as to overlap each other when viewed in the axial direction L.

In the present embodiment, the carrier C is provided with a second branched oil passage P20 that branches off from the second oil passage CP2 outward in the planetary radial direction PR. The second branched oil passage P20 communicates the second oil passage CP2 with the second outer peripheral opening PSo2. Therefore, in this example, the second oil passage CP2 communicates the second side surface opening PSs2 with the second outer peripheral opening PSo2 via the second branched oil passage P20.

The second oil receiving portion OR2 described above is provided so as to protrude from the second carrier side surface Cf2 to the second axial side L2, and is formed so as to guide the oil supplied from the inner side CRi in the carrier radial direction CR to the second side surface opening PSs2. Thus, the oil guided to the second side surface opening PSs2 by the second oil receiving portion OR2 flows through the second oil passage CP2 and the second branched oil passage P20, and is discharged from the second outer peripheral opening PSo2 to the outer side of the outer peripheral shaft surface PSf.

As described above, the vehicle drive device 100 includes:
 the rotary electric machine 1 including the rotor 12;
 the pair of output members 5 drivingly connected to the wheels W;
 the speed reducer 3 that reduces the speed of rotation of the rotor 12; and
 the differential gear mechanism 4 that distributes the driving force of the rotor 12 transmitted via the speed reducer 3 to the pair of output members 5, in which
 the speed reducer 3 is the planetary gear mechanism including the planetary gear PG including the first gear portion PG1 and the second gear portion PG2, and the carrier C that rotatably supports the planetary gear PG,
 assuming that the direction along the rotation axis CA of the carrier C is the axial direction L, one side in the axial direction L is the first axial side L1, the other side in the axial direction L is the second axial side L2, the direction orthogonal to the rotation axis CA of the carrier C is the carrier radial direction CR, and the direction orthogonal to the rotation axis PA of the planetary gear PG is the planetary radial direction PR,
 the first gear portion PG1 and the second gear portion PG2 are disposed side by side in the axial direction L,
 the carrier C includes the support shaft PS disposed so as to extend in the axial direction L through the inner side of the planetary gear PG in the planetary radial direction PR, the first oil receiving portion OR1, and the second oil receiving portion OR2,
 the planetary bearing PB is disposed between the outer peripheral shaft surface PSf that is the outer peripheral surface of the support shaft PS and the inner peripheral gear surface PGf that is the inner peripheral surface of the planetary gear PG,
 the carrier C is provided with the first oil passage CP1 and the second oil passage CP2,
 the first oil passage CP1 is formed so as to communicate the first side surface opening PSs1 that is open to the first carrier side surface Cf1 that is the side surface of the carrier C oriented to the first axial side L1 with the first outer peripheral opening PSo1 that is open to the outer peripheral shaft surface PSf,
 the second oil passage CP2 is formed so as to communicate the second side surface opening PSs2 that is open to the second carrier side surface Cf2 that is the side surface of the carrier C oriented to the second axial side L2 with the second outer peripheral opening PSo2 that is open to the outer peripheral shaft surface PSf on the second axial side L2 of the first outer peripheral opening PSo1,
 the first oil receiving portion OR1 is provided so as to protrude from the first carrier side surface Cf1 to the first axial side L1, and is formed so as to guide the oil supplied from the inner side CRi in the carrier radial direction CR to the first side surface opening PSs1, and the second oil receiving portion OR2 is provided so as to protrude from the second carrier side surface Cf2 to the second axial side L2, and is formed so as to guide the oil supplied from the inner side CRi in the carrier radial direction CR to the second side surface opening PSs2.

In this configuration, the first oil passage CP1 is supplied with oil guided from the first oil receiving portion OR1 provided on the first carrier side surface Cf1 to the first side surface opening PSs1, and the second oil passage CP2 is supplied with oil guided from the second oil receiving portion OR2 provided on the second carrier side surface Cf2 to the second side surface opening PSs2. The oil introduced into the first oil passage CP1 is supplied to the first outer peripheral opening PSo1, and the oil introduced into the second oil passage CP2 is supplied to the second outer peripheral opening PSo2. With this configuration, the oil can be received by both the first oil receiving portion OR1 and the second oil receiving portion OR2 and supplied to the outer peripheral shaft surface PSf. Therefore, a necessary amount of oil can be secured easily and the imbalance in the amount of oil supplied to the first outer peripheral opening PSo1 and the second outer peripheral opening PSo2 can be reduced easily. Thus, the planetary bearing PB can be lubricated appropriately.

In the present embodiment, the first oil passage CP1 and the second oil passage CP2 are separated from each other and do not communicate with each other. Therefore, the oil introduced from the first side surface opening PSs1 into the first oil passage CP1 is supplied to the first outer peripheral opening PSo1 without being supplied to the second outer peripheral opening PSo2. The oil introduced from the second side surface opening PSs2 into the second oil passage CP2 is supplied to the second outer peripheral opening PSo2 without being supplied to the first outer peripheral opening PSo1. Thus, the oil can appropriately be supplied to the first outer peripheral opening PSo1 and the second side surface opening PSs2 through separate paths.

The first outer peripheral opening PSo1 is disposed so as to overlap the first gear portion PG1 when viewed in the planetary radial direction PR along the planetary radial direction PR. The first outer peripheral opening PSo1 is disposed so as to overlap the first rolling portion PB1 when viewed in the planetary radial direction PR along the planetary radial direction PR. Thus, the inner peripheral surface of the first gear portion PG1 and the first rolling portion PB1 can appropriately be lubricated with the oil discharged from the first outer peripheral opening PSo1.

Regarding the disposition of two elements, the phrase "overlap when viewed in a specific direction" herein means that, when a virtual straight line parallel to the line-of-sight direction is moved in directions orthogonal to the virtual straight line, an area where the virtual straight line intersects both the two elements is present at least in part.

The second outer peripheral opening PSo2 is disposed so as to overlap the second gear portion PG2 when viewed in the planetary radial direction PR. The second outer peripheral opening PSo2 is disposed so as to overlap the second rolling portion PB2 when viewed in the planetary radial direction PR. Thus, the inner peripheral surface of the second gear portion PG2 and the second rolling portion PB2 can appropriately be lubricated with the oil discharged from the second outer peripheral opening PSo2.

In the present embodiment, a third outer peripheral opening PSo3 that is open to the outer peripheral shaft surface PSf is provided between the first outer peripheral opening PSo1 and the second outer peripheral opening PSo2 in the axial direction L. In this example, the third outer peripheral opening PSo3 is open to the outer peripheral shaft surface PSf between the first rolling portion PB1 and the second rolling portion PB2 in the axial direction L.

The first side surface opening PSs1 or the second side surface opening PSs2 communicates with the third outer peripheral opening PSo3. In the present embodiment, the first side surface opening PSs1 communicates with the third outer peripheral opening PSo3.

In the present embodiment, the carrier C is provided with a third branched oil passage P30 that branches off from the first oil passage CP1 outward in the planetary radial direction PR. The third branched oil passage P30 communicates the first oil passage CP1 with the third outer peripheral opening PSo3. Therefore, in this example, the first oil passage CP1 communicates the first side surface opening PSs1 with the third outer peripheral opening PSo3 via the third branched oil passage P30. Thus, the oil guided to the first side surface opening PSs1 by the first oil receiving portion OR1 flows through the first oil passage CP1 and the third branched oil passage P30, and is discharged from the third outer peripheral opening PSo3 to the outer side of the outer peripheral shaft surface PSf.

Figure 4:
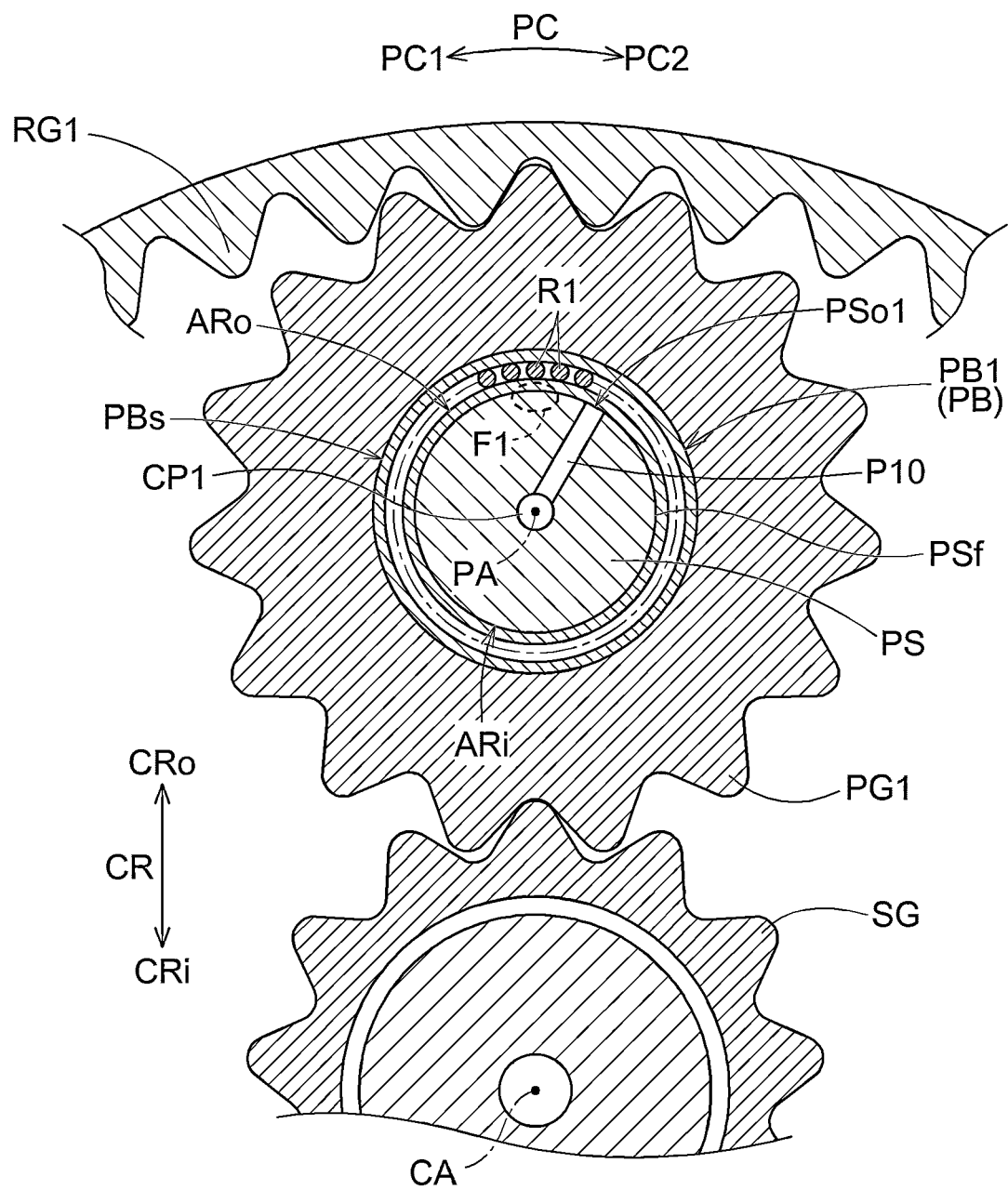
FIG. 4 is an end view taken along line IV-IV in FIG. 3.
Figure 5:
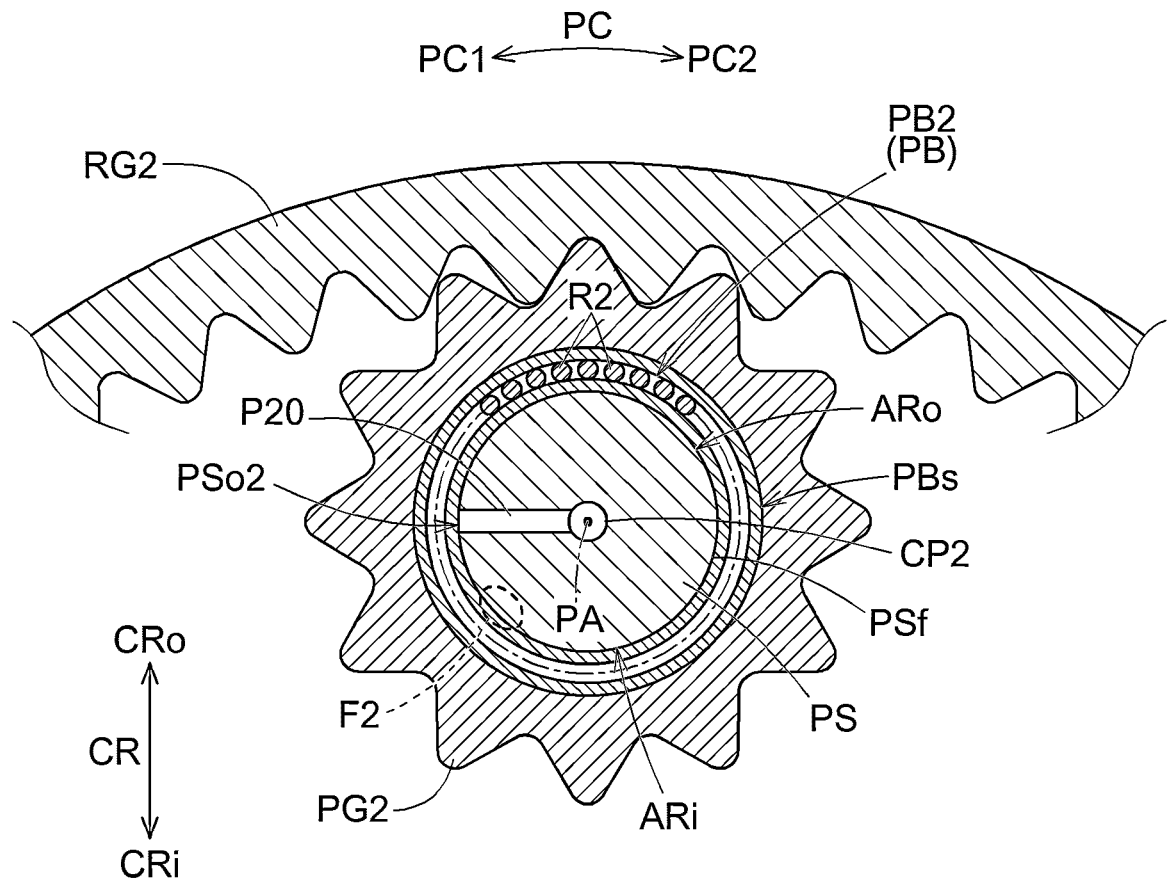
FIG. 5 is an end view taken along line V-V in FIG. 3.
Figure 6:
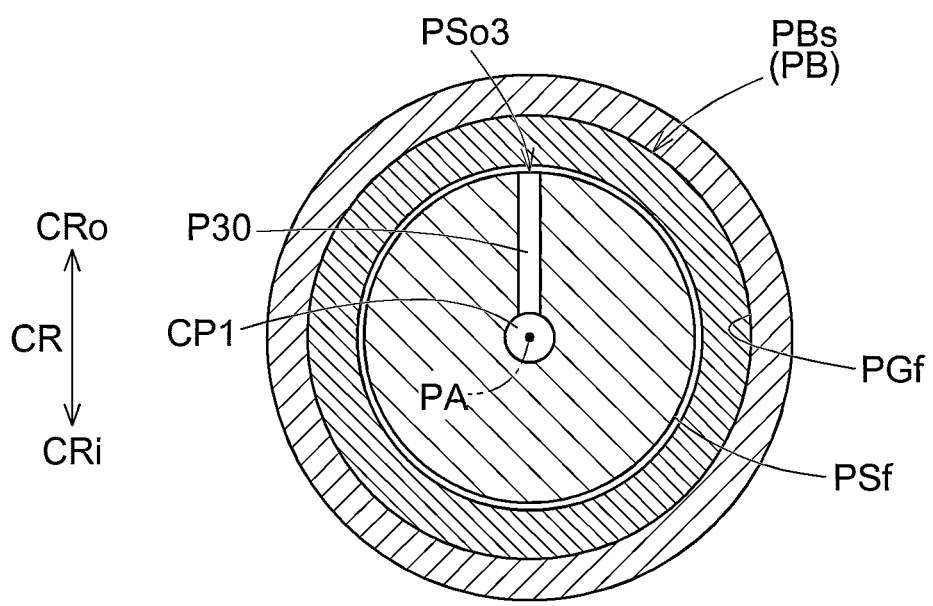
FIG. 6 is an end view taken along line VI-VI in FIG. 3.

As described above, the first outer peripheral opening PSo1, the second outer peripheral opening PSo2, and the third outer peripheral opening PSo3 are open to the outer peripheral shaft surface PSf at different positions in the axial direction L. Although details will be described later, as shown in FIG. 4, the position in the planetary circumferential direction PC where the first outer peripheral opening PSo1 is open to the outer peripheral shaft surface PSf is determined based on influence on the outer peripheral shaft surface PSf from an intermesh pressure between the first gear portion PG1 and other gears. As shown in FIG. 5, the position in the planetary circumferential direction PC where the second outer peripheral opening PSo2 is open to the outer peripheral shaft surface PSf is determined based on influence on the outer peripheral shaft surface PSf from an intermesh pressure between the second gear portion PG2 and other gears. As shown in FIG. 6, the position in the planetary circumferential direction PC where the third outer peripheral opening PSo3 is open to the outer peripheral shaft surface PSf is determined based on a relationship with an oil discharge amount regardless of the intermesh of the plurality of gears. In the present embodiment, the third outer peripheral opening PSo3 is open so as to be oriented to the carrier radially outer side CRo. Therefore, the third outer peripheral opening PSo3 is provided at a position where the direction of oil flow from the first oil passage CP1 to the third outer peripheral opening PSo3 agrees, to a high degree, with the direction of a centrifugal force acting on the oil when the carrier C rotates about the carrier axis CA (i.e., the direction to the carrier radially outer side CRo). Thus, the amount of oil discharged from the third outer peripheral opening PSo3 can be increased easily. In FIG. 3, the positions of the first outer peripheral opening PSo1, the second outer peripheral opening PSo2, and the third outer peripheral opening PSo3 in the axial direction L are shown to facilitate understanding of the positions of these outer peripheral openings. In actuality, however, the positions of the outer peripheral openings in the planetary circumferential direction PC are different as shown in FIGS. 4 to 6.

As described above, in the present embodiment,
the planetary bearing PB includes the first rolling portion PB1 including the plurality of first rolling elements R1, the second rolling portion PB2 disposed on the second axial side L2 of the first rolling portion PB1 and including the plurality of second rolling elements R2, and the support frame PBs that supports the first rolling portion PB1 and the second rolling portion PB2,
the first outer peripheral opening PSo1 is disposed so as to overlap the first rolling portion PB1 when viewed in the planetary radial direction PR along the planetary radial direction PR,
the second outer peripheral opening PSo2 is disposed so as to overlap the second rolling portion PB2 when viewed in the planetary radial direction PR,
the third outer peripheral opening PSo3 that is open to the outer peripheral shaft surface PSf is provided between the first rolling portion PB1 and the second rolling portion PB2 in the axial direction L,
the first side surface opening PSs1 or the second side surface opening PSs2 communicates with the third outer peripheral opening PSo3, and
the third outer peripheral opening PSo3 is open so as to be oriented to the outer side CRo in the carrier radial direction CR.

With this configuration, the first rolling portion PB1 and the second rolling portion PB2 of the planetary bearing PB can be lubricated appropriately and the oil can be supplied also between the first rolling portion PB1 and the second rolling portion PB2 in the axial direction L. Therefore, the central area of the support frame PBs of the planetary bearing PB in the axial direction L can also be lubricated appropriately. Thus, even if the support frame PBs is distorted due to the centrifugal force along with the rotation of the carrier C, wear due to sliding between the support frame PBs and the inner peripheral gear surface PGf or the outer peripheral shaft surface PSf can be reduced. In this configuration, the third outer peripheral opening PSo3 is open so as to be oriented to the carrier radially outer side CRo where the direction of oil flow to the third outer peripheral opening PSo3 easily agrees, to a high degree, with the direction of the centrifugal force acting on the oil when the carrier C rotates. Therefore, even if the third outer peripheral opening PSo3 is disposed downstream of the first outer peripheral opening PSo1 or the second outer peripheral opening PSo2 in the oil flow direction, the amount of oil supplied from the third outer peripheral opening PSo3 can be secured easily.

As shown in FIGS. 4 and 5, in an area on the outer peripheral shaft surface PSf that is located on the carrier radially inner side CRi of the planetary axis PA (hereinafter referred to as "radially inner area ARi"), when the carrier C rotates about the carrier axis CA, the direction from the planetary axis PA to that region and the direction of the centrifugal force acting on the oil are opposite to each other in the carrier radial direction CR. In the present embodiment, the first outer peripheral opening PSo1 and the second outer peripheral opening PSo2 are open to an area (hereinafter referred to as "radially outer area ARo") other than the radially inner area ARi on the outer peripheral shaft surface PSf. Thus, the oil can appropriately be discharged from the first outer peripheral opening PSo1 and the second outer peripheral opening PSo2 by using the centrifugal force acting on the oil when the carrier C rotates.

In the present embodiment, the first outer peripheral opening PSo1 and the second outer peripheral opening PSo2 are open at different positions in the planetary circumferential direction PC on the outer peripheral shaft surface PSf. That is, in the present embodiment, the influence on the outer peripheral shaft surface PSf from the intermesh pressure between the first gear portion PG1 and other gears and the influence on the outer peripheral shaft surface PSf from the intermesh pressure between the second gear portion PG2 and other gears are different from each other. The position in the planetary circumferential direction PC where the first outer peripheral opening PSo1 is open to the outer peripheral shaft surface PSf and the position in the planetary circumferential direction PC where the second outer peripheral opening PSo2 is open to the outer peripheral shaft surface PSf are set based on the above influences.

As described above, in the present embodiment, the speed reducer 3 includes the sun gear SG that meshes with the first gear portion PG1, the first ring gear RG1 that meshes with the first gear portion PG1, and the second ring gear RG2 that meshes with the second gear portion PG2, the sun gear SG is connected to the rotor 12 so as to rotate integrally with the rotor 12,
the first ring gear RG1 is fixed to the non-rotary member (in this example, the case 9),
the second ring gear RG2 is connected to the input element of the differential gear mechanism 4 (in this case, the connecting portion 411c), and
assuming that the direction about the rotation axis PA of the planetary gear PG is the planetary circumferential direction PC,
the first outer peripheral opening PSo1 and the second outer peripheral opening PSo2 are open at different positions in the planetary circumferential direction PC.

In this configuration, the first gear portion PG1 meshes with both the sun gear SG and the first ring gear RG1, and the second gear portion PG2 meshes only with the second ring gear RG2. Therefore, the position on the outer peripheral shaft surface PSf where the load is likely to become large may differ in the planetary circumferential direction PC between the portion corresponding to the first gear portion PG1 and the portion corresponding to the second gear portion PG2. With this configuration, even in such a case, the oil can easily be supplied appropriately to each part of the outer peripheral shaft surface PSf by providing the first outer peripheral opening PSo1 and the second outer peripheral opening PSo2 at different positions in the planetary circumferential direction PC.

The setting of the positions of the first outer peripheral opening PSo1 and the second outer peripheral opening PSo2 will be described in detail below. As shown in FIGS. 4 and 5, a side where the planetary gear PG rotates while the vehicle is moving forward will be referred to as "forward rotation side PC1", and the opposite side will be referred to as "reverse rotation side PC2".

As shown in FIG. 4, a position in the planetary circumferential direction PC where the load acting in the planetary radial direction PR on the outer peripheral shaft surface PSf via the first gear portion PG1 and the planetary bearing PB due to the intermesh between the first gear portion PG1 and other gears (in this case, the sun gear SG and the first ring gear RG1) is maximum will be referred to as "first load bearing position F1". In this case, a position in the planetary circumferential direction PC where the above load is maximum while the vehicle is moving forward will be referred to as "first load bearing position F1". The first load bearing position F1 is set to a position where the resultant force of forces acting in individual directions due to the intermesh between the first gear portion PG1 and the sun gear SG and the intermesh between the first gear portion PG1 and the first ring gear RG1 is maximum. The first load bearing position F1 is set as appropriate through experiments etc.

The first outer peripheral opening PSo1 is disposed to adjoin the first load bearing position F1 on the reverse rotation side PC2. In the present embodiment, the first outer peripheral opening PSo1 is disposed within a range of 90° or less on the reverse rotation side PC2 of the first load bearing position F1. The first outer peripheral opening PSo1 is preferably disposed within a range of 10° to 45° on the reverse rotation side PC2 of the first load bearing position F1. As described above, in the present embodiment, the first outer peripheral opening PSo1 is disposed in the radially outer area ARo. Therefore, in the present embodiment, the first outer peripheral opening PSo1 is disposed in the radially outer area ARo and within the range of 90° or less (preferably within the range of 10° to 45°) on the reverse rotation side PC2 of the first load bearing position F1.

As shown in FIG. 5, a position in the planetary circumferential direction PC where the load acting in the planetary radial direction PR on the outer peripheral shaft surface PSf via the second gear portion PG2 and the planetary bearing PB due to the intermesh between the second gear portion PG2 and other gears (in this case, the second ring gear RG2) is maximum will be referred to as "second load bearing position F2". In this case, a position in the planetary circumferential direction PC where the above load is maximum while the vehicle is moving forward will be referred to as "second load bearing position F2". The second load bearing position F2 is set to a position where the resultant force of forces acting in individual directions due to the intermesh between the second gear portion PG2 and the second ring gear RG2 is maximum. The second load bearing position F2 is set as appropriate through experiments etc.

The second outer peripheral opening PSo2 is disposed to adjoin the second load bearing position F2 on the reverse rotation side PC2. In the present embodiment, the second outer peripheral opening PSo2 is disposed within a range of 90° or less on the reverse rotation side PC2 of the second load bearing position F2. The second outer peripheral opening PSo2 is preferably disposed within a range of 10° to 45° on the reverse rotation side PC2 of the second load bearing position F2. As described above, in the present embodiment, the second outer peripheral opening PSo2 is disposed in the radially outer area ARo. Therefore, the second outer peripheral opening PSo2 is disposed in the radially outer area ARo and within the range of 90° or less (preferably within the range of 10° to 45°) on the reverse rotation side PC2 of the second load bearing position F2.

As described above, in the present embodiment,
the first gear portion PG1 is disposed on the first axial side L1 of the second gear portion PG2,
the first outer peripheral opening PSo1 is disposed so as to overlap the first gear portion PG1 when viewed in the planetary radial direction PR along the planetary radial direction PR,
the second outer peripheral opening PSo2 is disposed so as to overlap the second gear portion PG2 when viewed in the planetary radial direction PR,
assuming that the side where the planetary gear PG rotates while the vehicle is moving forward is the forward rotation side PC1, the opposite side is the reverse rotation side PC2, and the direction about the rotation axis PA of the planetary gear PG is the planetary circumferential direction PC,
assuming that the position in the planetary circumferential direction PC where the load acting in the planetary radial direction PR on the outer peripheral shaft surface PSf via the first gear portion PG1 and the planetary bearing PB due to the intermesh between the first gear portion PG1 and other gears (in this case, the sun gear SG and the first ring gear RG1) is maximum is the first load bearing position F1, and the position in the planetary circumferential direction PC where the load acting in the planetary radial direction PR on the outer peripheral shaft surface PSf via the second gear portion PG2 and the planetary bearing PB due to the intermesh between the second gear portion PG2 and other gears (in this case, the second ring gear RG2) is maximum is the second load bearing position F2, the first outer peripheral opening PSo1 is disposed to adjoin the first load bearing position F1 on the reverse rotation side PC2, and the second outer peripheral opening PSo2 is disposed to adjoin the second load bearing position F2 on the reverse rotation side PC2.

In this configuration, the first outer peripheral opening PSo1 through which the oil is supplied to the first gear portion PG1 is disposed to adjoin the first load bearing position F1 on the reverse rotation side PC2. Therefore, the oil can appropriately be supplied to the first load bearing position F1 adjoining the first outer peripheral opening PSo1 on the forward rotation side PC1 by the rotation of the first gear portion PG1 to the forward rotation side PC1. The second outer peripheral opening PSo2 through which the oil is supplied to the second gear portion PG2 is disposed to adjoin the second load bearing position F2 on the reverse rotation side PC2. Therefore, the oil can appropriately be supplied to the second load bearing position F2 adjoining the second outer peripheral opening PSo2 on the forward rotation side PC1 by the rotation of the second gear portion PG2 to the forward rotation side PC1. With this configuration, the oil can appropriately be supplied to both the first load bearing position F1 and the second load bearing position F2 where the load is likely to become large while the vehicle is moving forward.

In the present embodiment, the third outer peripheral opening PSo3 out of the first outer peripheral opening PSo1, the second outer peripheral opening PSo2, and the third outer peripheral opening PSo3 is disposed at the farthest point on the carrier radially outer side CRo. Therefore, in consideration of only the positional relationship in the planetary circumferential direction PC (i.e., ignoring the positional relationship among the outer peripheral openings in the axial direction L), the amount of oil discharged from the third outer peripheral opening PSo3 is likely to be the largest. In this example, the first outer peripheral opening PSo1 is disposed on the carrier radially outer side CRo of the second outer peripheral opening PSo2 (see FIGS. 4 and 5). Therefore, in consideration of only the positional relationship in the planetary circumferential direction PC, the amount of oil discharged from the second outer peripheral opening PSo2 is likely to be the smallest among the outer peripheral openings. As shown in FIG. 3, however, in the present embodiment, the second oil passage CP2 through which the oil guided by the second oil receiving portion OR2 flows communicates only with the second outer peripheral opening PSo2 out of the first outer peripheral opening PSo1, the second outer peripheral opening PSo2, and the third outer peripheral opening PSo3. In other words, the second oil passage CP2 is a passage dedicated to the second outer peripheral opening PSo2. Therefore, all (or the majority) of the oil flowing through the second oil passage CP2 can be supplied to the second outer peripheral opening PSo2 that is likely to have a small oil discharge amount due to its open position in the planetary circumferential direction PC.

In the present embodiment, the third outer peripheral opening PSo3 that is likely to secure a larger oil discharge amount than the first outer peripheral opening PSo1 due to its open position in the planetary circumferential direction PC is disposed in the first oil passage CP1 downstream of the first outer peripheral opening PSo1 in the oil flow direction. That is, the third outer peripheral opening PSo3 is disposed on the second axial side L2 of the first outer peripheral opening PSo1 in the first oil passage CP1. That is, the third outer peripheral opening PSo3 is likely to secure the oil discharge amount compared with the first outer peripheral opening PSo1 in terms of the open position in the planetary circumferential direction PC, and the first outer peripheral opening PSo1 is likely to secure the oil discharge amount compared with the third outer peripheral opening PSo3 in terms of the open position in the axial direction L. Thus, the amounts of oil discharged from the first outer peripheral opening PSo1 and the third outer peripheral opening PSo3 are balanced appropriately.

As described above, in the present embodiment, the open positions of the first outer peripheral opening PSo1, the second outer peripheral opening PSo2, and the third outer peripheral opening PSo3 differ in the planetary circumferential direction PC and in the axial direction L. This prevents a large imbalance in the amounts of oil discharged from the first outer peripheral opening PSo1, the second outer peripheral opening PSo2, and the third outer peripheral opening PSo3.

Other Embodiments

Next, other embodiments of the vehicle drive device will be described.

(1) The above embodiment illustrates the configuration in which the first oil passage CP1 and the second oil passage CP2 are separated from each other and do not communicate with each other. However, the present disclosure is not limited to such a configuration, and the first oil passage CP1 and the second oil passage CP2 may communicate with each other. In this case, it is preferable to provide, for example, a throttling portion (not shown) in a communication passage between the first oil passage CP1 and the second oil passage CP2 to limit the amount of oil flowing between the first oil passage CP1 and the second oil passage CP2.

(2) The above embodiment illustrates the configuration in which the first side surface opening PSs1 communicates with the third outer peripheral opening PSo3. However, the present disclosure is not limited to such a configuration, and the second side surface opening PSs2 may communicate with the third outer peripheral opening PSo3. In this case, the third branched oil passage P30 is formed so as to communicate, instead of the first oil passage CP1, the second oil passage CP2 with the third outer peripheral opening PSo3.

(3) The above embodiment illustrates the configuration in which the first outer peripheral opening PSo1 and the second outer peripheral opening PSo2 are open at different positions in the planetary circumferential direction PC on the outer peripheral shaft surface PSf. However, the present disclosure is not limited to such a configuration. Depending on the positional relationship between the first load bearing position F1 and the second load bearing position F2, the first outer peripheral opening PSo1 and the second outer peripheral opening PSo2 may be open at the same position in the planetary circumferential direction PC on the outer peripheral shaft surface PSf.

(4) The above embodiment illustrates the configuration in which the third outer peripheral opening PSo3 is open so as to be oriented to the carrier radially outer side CRo. However, the present disclosure is not limited to such a configuration, and the third outer peripheral opening PSo3 may be open so as to be oriented in a direction shifted from the carrier radially outer side CRo.

(5) The above embodiment illustrates the configuration in which the third outer peripheral opening PSo3 is disposed in the first oil passage CP1 downstream of the first outer peripheral opening PSo1 in the oil flow direction. However, the present disclosure is not limited to such a configuration, and the third outer peripheral opening PSo3 may be disposed upstream of the first outer peripheral opening PSo1 in the oil flow direction. That is, the third outer peripheral opening PSo3 may be disposed on the first axial side L1 of the first outer peripheral opening PSo1 in the first oil passage CP1.

(6) The above embodiment illustrates the configuration in which the first supply portion 81 is provided in the shaft member 2 and the second supply portion 82 is provided in the differential gear mechanism 4. However, the present disclosure is not limited to such a configuration. The first supply portion 81 is provided at any position in the vehicle drive device 100 as long as it supplies oil to the first oil receiving portion OR1 of the carrier C from the carrier radially inner side CRi. The second supply portion 82 is provided at any position in the vehicle drive device 100 as long as it supplies oil to the second oil receiving portion OR2 of the carrier C from the carrier radially inner side CRi.

(7) The above embodiment illustrates the configuration in which the drive source is the rotary electric machine 1 including the rotor 12 that rotates integrally with the shaft member 2. However, the present disclosure is not limited to such a configuration, and an internal combustion engine serving as the drive source may be provided outside the vehicle drive device 100. In this case, the vehicle drive device 100 includes an input member drivingly connected to the internal combustion engine, and the driving force of the internal combustion engine is input to the vehicle drive device 100 via the input member.

(8) The above embodiment illustrates the configuration in which the vehicle drive device 100 includes the differential gear mechanism 4 that distributes the driving force of the rotor 12 transmitted via the speed reducer 3 to the pair of output members 5. However, the present disclosure is not limited to such a configuration, and the rotation of the rotor 12 transmitted via the speed reducer 3 may be transmitted to a single output member 5 (and thus a single wheel W). Such a configuration can suitably be applied to the vehicle drive device 100 provided in a so-called in-wheel motor vehicle.

(9) The configuration disclosed in the above embodiment can be applied in combination with any of the configurations disclosed in the other embodiments as long as no contradiction arises. Regarding the other configurations as well, the embodiments disclosed herein are merely illustrative in all respects. Therefore, various modifications can be made as appropriate without departing from the spirit of the present disclosure.

Summary of Present Embodiment

The embodiment of the vehicle drive device described above will be summarized below.

A vehicle drive device (100) including:
a shaft member (2) to which a driving force of a drive source is input; and
a speed reducer (3) that reduces a speed of rotation of the shaft member (2) and outputs the rotation to an output member (5) drivingly connected to a wheel (W), in which
the speed reducer (3) is a planetary gear mechanism including a planetary gear (PG) including a first gear portion (PG1) and a second gear portion (PG2), and a carrier (C) that rotatably supports the planetary gear (PG),
assuming that a direction along a rotation axis (CA) of the carrier (C) is an axial direction (L), one side in the axial direction (L) is a first axial side (L1), the other side in the axial direction (L) is a second axial side (L2), a direction orthogonal to the rotation axis (CA) of the carrier (C) is a carrier radial direction (CR), and a direction orthogonal to a rotation axis (PA) of the planetary gear (PG) is a planetary radial direction (PR),
the first gear portion (PG1) and the second gear portion (PG2) are disposed side by side in the axial direction (L),
the carrier (C) includes a support shaft (PS) disposed so as to extend in the axial direction (L) through an inner side of the planetary gear (PG) in the planetary radial direction (PR), a first oil receiving portion (OR1), and a second oil receiving portion (OR2),
a planetary bearing (PB) is disposed between an outer peripheral shaft surface (PSf) that is an outer peripheral surface of the support shaft (PS) and an inner peripheral gear surface (PGf) that is an inner peripheral surface of the planetary gear (PG),
the carrier (C) is provided with a first oil passage (CP1) and a second oil passage (CP2), the first gear portion (PG1) is disposed on the first axial side (L1) of the second gear portion (PG2),
the first oil passage (CP1) is formed so as to communicate a first side surface opening (PSs1) that is open to a first carrier side surface (Cf1) that is a side surface of the carrier (C) oriented to the first axial side (L1) with a first outer peripheral opening (PSo1) that is open to the outer peripheral shaft surface (PSf),
the first outer peripheral opening (PSo1) is disposed so as to overlap the first gear portion (PG1) when viewed in the planetary radial direction (PR) along the planetary radial direction (PR),
the second oil passage (CP2) is formed so as to communicate a second side surface opening (PSs2) that is open to a second carrier side surface (Cf2) that is a side surface of the carrier (C) oriented to the second axial side (L2) with a second outer peripheral opening (PSo2) that is open to the outer peripheral shaft surface (PSf) on the second axial side (L2) of the first outer peripheral opening (PSo1),
the second outer peripheral opening (PSo2) is disposed so as to overlap the second gear portion (PG2) when viewed in the planetary radial direction (PR),
the first oil receiving portion (OR1) is provided so as to protrude from the first carrier side surface (Cf1) to the first axial side (L1), and is formed so as to guide oil supplied from an inner side in the carrier radial direction (CR) to the first side surface opening (PSs1), and
the second oil receiving portion (OR2) is provided so as to protrude from the second carrier side surface (Cf2) to the second axial side (L2), and is formed so as to guide the oil supplied from the inner side in the carrier radial direction (CR) to the second side surface opening (PSs2).

In this configuration, the first oil passage (CP1) is supplied with the oil guided from the first oil receiving portion (OR1) provided on the first carrier side surface (Cf1) to the first side surface opening (PSs1), and the second oil passage (CP2) is supplied with the oil guided from the second oil receiving portion (OR2) provided on the second carrier side surface (Cf2) to the second side surface opening (PSs2). The oil introduced into the first oil passage (CP1) is supplied to the first outer peripheral opening (PSo1), and the oil introduced into the second oil passage (CP2) is supplied to the second outer peripheral opening (PSo2). With this configuration, the oil can be received by both the first oil receiving portion (OR1) and the second oil receiving portion (OR2) and supplied to the outer peripheral shaft surface (PSf). Therefore, a necessary amount of oil can be secured easily and the imbalance in the amount of oil supplied to the first outer peripheral opening (PSo1) and the second outer peripheral opening (PSo2) can be reduced easily. Thus, the planetary bearing (PB) can be lubricated appropriately. With this configuration, the inner peripheral surface of the first gear portion (PG1) can appropriately be lubricated with the oil discharged from the first outer peripheral opening (PSo1). The inner peripheral surface of the second gear portion (PG2) can appropriately be lubricated with the oil discharged from the second outer peripheral opening (PSo2).

It is preferable that the planetary bearing (PB) include a first rolling portion (PB1) including a plurality of first rolling elements (R1), a second rolling portion (PB2) disposed on the second axial side (L2) of the first rolling portion (PB1) and including a plurality of second rolling elements (R2), and a support frame (PBs) that supports the first rolling portion (PB1) and the second rolling portion (PB2),
  a third outer peripheral opening (PSo3) that is open to the outer peripheral shaft surface (PSf) be provided between the first rolling portion (PB1) and the second rolling portion (PB2) in the axial direction (L), and
  the first side surface opening (PSs1) communicate with the third outer peripheral opening (PSo3).

With this configuration, the first rolling portion (PB1) and the second rolling portion (PB2) of the planetary bearing (PB) can be lubricated appropriately and the oil can be supplied also between the first rolling portion (PB1) and the second rolling portion (PB2) in the axial direction (L). Therefore, the central area of the support frame (PBs) of the planetary bearing (PB) in the axial direction (L) can also be lubricated appropriately. Thus, even if the support frame (PBs) is distorted due to the centrifugal force along with the rotation of the carrier (C), wear due to sliding between the support frame (PBs) and the inner peripheral gear surface (PGf) or the outer peripheral shaft surface (PSf) can be reduced.

It is preferable that, assuming that a side where the planetary gear (PG) rotates while a vehicle is moving forward is a forward rotation side (PC1), a side opposite to the forward rotation side (PC1) is a reverse rotation side (PC2), and a direction about the rotation axis (PA) of the planetary gear (PG) is a planetary circumferential direction (PC), assuming that a position in the planetary circumferential direction (PC) where a load acting in the planetary radial direction (PR) on the outer peripheral shaft surface (PSf) via the first gear portion (PG1) and the planetary bearing (PB) due to an intermesh between the first gear portion (PG1) and another gear is maximum is a first load bearing position (F1), and a position in the planetary circumferential direction (PC) where a load acting in the planetary radial direction (PR) on the outer peripheral shaft surface (PSf) via the second gear portion (PG2) and the planetary bearing (PB) due to an intermesh between the second gear portion (PG2) and another gear is maximum is a second load bearing position (F2),
  the first outer peripheral opening (PSo1) be disposed to adjoin the first load bearing position (F1) on the reverse rotation side (PC2),
  the second outer peripheral opening (PSo2) be disposed to adjoin the second load bearing position (F2) on the reverse rotation side (PC2), and
  the third outer peripheral opening (PSo3) be open so as to be oriented to an outer side in the carrier radial direction (CR).

In this configuration, the first outer peripheral opening (PSo1) through which the oil is supplied to the first gear portion (PG1) is disposed to adjoin the first load bearing position (F1) on the reverse rotation side (PC2). Therefore, the oil can appropriately be supplied to the first load bearing position (F1) adjoining the first outer peripheral opening (PSo1) on the forward rotation side (PC1) by the rotation of the first gear portion (PG1) to the forward rotation side (PC1). The second outer peripheral opening (PSo2) through which the oil is supplied to the second gear portion (PG2) is disposed to adjoin the second load bearing position (F2) on the reverse rotation side (PC2). Therefore, the oil can appropriately be supplied to the second load bearing position (F2) adjoining the second outer peripheral opening (PSo2) on the forward rotation side (PC1) by the rotation of the second gear portion (PG2) to the forward rotation side (PC1). With this configuration, the oil can appropriately be supplied to both the first load bearing position (F1) and the second load bearing position (F2) where the load is likely to become large while the vehicle is moving forward. In this configuration, the third outer peripheral opening (PSo3) is open so as to be oriented to a carrier radially outer side (CRo) where the direction of oil flow to the third outer peripheral opening (PSo3) easily agrees, to a high degree, with the direction of the centrifugal force acting on the oil when the carrier (C) rotates. Therefore, even if the third outer peripheral opening (PSo3) is disposed downstream of the first outer peripheral opening (PSo1) or the second outer peripheral opening (PSo2) in the oil flow direction, the amount of oil supplied from the third outer peripheral opening (PSo3) can be secured easily.

It is preferable that the drive source be a rotary electric machine (1) including a rotor (12) that rotates integrally with the shaft member (2),
  a pair of the output members (5) be provided,
  the vehicle drive device include a differential gear mechanism (4) that distributes a driving force of the rotor (12) transmitted via the speed reducer (3) to the pair of the output members (5),
  the rotor (12), the speed reducer (3), and the differential gear mechanism (4) be disposed coaxially,
  the rotor (12), the speed reducer (3), and the differential gear mechanism (4) be disposed in the stated order from the first axial side (L1) to the second axial side (L2),
  the vehicle drive device include:
  the shaft member (2) disposed so as to extend in the axial direction (L) through an inner side of the speed reducer (3) in the carrier radial direction (CR);

a first supply portion (81) that supplies the oil to the first oil receiving portion (OR1) from the inner side in the carrier radial direction (CR); and a second supply portion (82) that supplies the oil to the second oil receiving portion (OR2) from the inner side in the carrier radial direction (CR), the first supply portion (81) be provided in the shaft member (2), and the second supply portion (82) be provided in the differential gear mechanism (4).

With this configuration, the oil can appropriately be supplied to the first oil receiving portion (OR1) and the second oil receiving portion (OR2).

It is preferable that the drive source be a rotary electric machine (1) including a rotor (12) that rotates integrally with the shaft member (2), a pair of the output members (5) be provided, the vehicle drive device include a differential gear mechanism (4) that distributes a driving force of the rotor (12) transmitted via the speed reducer (3) to the pair of the output members (5), the speed reducer (3) include a sun gear (SG) that meshes with the first gear portion (PG1), a first ring gear (RG1) that meshes with the first gear portion (PG1), and a second ring gear (RG2) that meshes with the second gear portion (PG2), the sun gear (SG) be connected to the rotor (12) so as to rotate integrally with the rotor (12), the first ring gear (RG1) be fixed to a non-rotary member (9), the second ring gear (RG2) be connected to an input element of the differential gear mechanism (4), and assuming that a direction about the rotation axis (PA) of the planetary gear (PG) is a planetary circumferential direction (PC), the first outer peripheral opening (PSo1) and the second outer peripheral opening (PSo2) be open at different positions in the planetary circumferential direction (PC).

In this configuration, the first gear portion (PG1) meshes with both the sun gear (SG) and the first ring gear (RG1), and the second gear portion (PG2) meshes only with the second ring gear (RG2). Therefore, the position on the outer peripheral shaft surface (PSf) where the load is likely to become large may differ in the planetary circumferential direction (PC) between the portion corresponding to the first gear portion (PG1) and the portion corresponding to the second gear portion (PG2). With this configuration, even in such a case, the oil can easily be supplied appropriately to each part of the outer peripheral shaft surface (PSf) by providing the first outer peripheral opening (PSo1) and the second outer peripheral opening (PSo2) at different positions in the planetary circumferential direction (PC).

INDUSTRIAL APPLICABILITY

The technology according to the present disclosure is applicable to a vehicle drive device including a rotary electric machine including a rotor, a pair of output members drivingly connected to wheels, a speed reducer that reduces the speed of rotation of the rotor, and a differential gear mechanism that distributes a driving force of the rotor transmitted via the speed reducer to the pair of output members.

DESCRIPTION OF THE REFERENCE NUMERALS

100: vehicle drive device, 1: rotary electric machine (drive source), 12: rotor, 2: shaft member, 3: speed reducer, 4: differential gear mechanism, 5: output member, 9: case (non-rotary member), 81: first supply portion, 82: second supply portion, C: carrier, CA: rotation axis of carrier, CP1: first oil passage, CP2: second oil passage, Cf1: first carrier side surface, Cf2: second carrier side surface, OR1: first oil receiving portion, OR2: second oil receiving portion, PG: planetary gear, PA: rotation axis of planetary gear, PG1: first gear portion, PG2: second gear portion, PGf: inner peripheral gear surface, PB: planetary bearing, PB1: first rolling portion, R1: first rolling element, PB2: second rolling portion, R2: second rolling element, PBs: support frame, PS: support shaft, PSf: outer peripheral shaft surface, PSs1: first side surface opening, PSs2: second side surface opening, PSo1: first outer peripheral opening, PSo2: second outer peripheral opening, PSo3: third outer peripheral opening, SG: sun gear, RG1: first ring gear, RG2: second ring gear, W: wheel, F1: first load bearing position, F2: second load bearing position, L: axial direction, L1: first axial side, L2: second axial side, CR: carrier radial direction, CRi: inner side in carrier radial direction, CRo: outer side in carrier radial direction, PR: planetary radial direction, PC: planetary circumferential direction, PC1: forward rotation side, PC2: reverse rotation side

The invention claimed is:

1. A vehicle drive device comprising:

a shaft member to which a driving force of a drive source is input; and a speed reducer that reduces a speed of rotation of the shaft member and outputs the rotation to an output member drivingly connected to a wheel, wherein the speed reducer is a planetary gear mechanism including a planetary gear including a first gear portion and a second gear portion, and a carrier that rotatably supports the planetary gear, assuming that a direction along a rotation axis of the carrier is an axial direction, one side in the axial direction is a first axial side, the other side in the axial direction is a second axial side, a direction orthogonal to the rotation axis of the carrier is a carrier radial direction, and a direction orthogonal to a rotation axis of the planetary gear is a planetary radial direction, the first gear portion and the second gear portion are disposed side by side in the axial direction with the first gear portion and the second gear portion meshing with different gears, the carrier includes a support shaft disposed so as to extend in the axial direction through an inner side of the planetary gear in the planetary radial direction, a first oil receiving portion, and a second oil receiving portion, a planetary bearing is disposed between an outer peripheral shaft surface that is an outer peripheral surface of the support shaft and an inner peripheral gear surface that is an inner peripheral surface of the planetary gear, the carrier is provided with a first oil passage and a second oil passage that are separated from each other and the first oil passage and the second oil passage do not communicate with each other within the carrier, the first gear portion is disposed on the first axial side of the second gear portion, the first oil passage is formed so as to communicate a first side surface opening that is open to a first carrier side surface that is a side surface of the carrier oriented to the first axial side with a first outer peripheral opening that is open to the outer peripheral shaft surface, the first outer peripheral opening is disposed so as to overlap the first gear portion in a planetary radial view along the planetary radial direction, the second oil passage is formed so as to communicate a second side surface opening that is open to a second carrier side surface that is a side surface of the carrier oriented to the second axial side with a second outer peripheral opening that is open to the outer peripheral shaft surface on the second axial side of the first outer peripheral opening, the second outer peripheral opening is disposed so as to overlap the second gear portion in the planetary radial view, the first oil receiving portion is provided so as to protrude from the first carrier side surface to the first axial side, and is formed so as to guide oil supplied from an inner side in the carrier radial direction to the first side surface opening, and the second oil receiving portion is provided so as to protrude from the second carrier side surface to the second axial side, and is formed so as to guide the oil supplied from the inner side in the carrier radial direction to the second side surface opening.

2. The vehicle drive device according to claim 1, wherein the planetary bearing includes a first rolling portion including a plurality of first rolling elements, a second rolling portion disposed on the second axial side of the first rolling portion and including a plurality of second rolling elements, and a support frame that supports the first rolling portion and the second rolling portion, a third outer peripheral opening that is open to the outer peripheral shaft surface is provided between the first rolling portion and the second rolling portion in the axial direction, and the first side surface opening communicates with the third outer peripheral opening.

3. The vehicle drive device according to claim 2, wherein assuming that a side where the planetary gear rotates while a vehicle is moving forward is a forward rotation side, a side opposite to the forward rotation side is a reverse rotation side, and a direction about the rotation axis of the planetary gear is a planetary circumferential direction, assuming that a position in the planetary circumferential direction where a load acting in the planetary radial direction on the outer peripheral shaft surface via the first gear portion and the planetary bearing due to an intermesh between the first gear portion and another gear is maximum is a first load bearing position, and a position in the planetary circumferential direction where a load acting in the planetary radial direction on the outer peripheral shaft surface via the second gear portion and the planetary bearing due to an intermesh between the second gear portion and another gear is maximum is a second load bearing position, the first outer peripheral opening is disposed to adjoin the first load bearing position on the reverse rotation side, the second outer peripheral opening is disposed to adjoin the second load bearing position on the reverse rotation side, and the third outer peripheral opening is open so as to be oriented to an outer side in the carrier radial direction.

4. The vehicle drive device according to claim 1, wherein the drive source is a rotary electric machine including a rotor that rotates integrally with the shaft member, a pair of the output members is provided, the vehicle drive device includes a differential gear mechanism that distributes a driving force of the rotor transmitted via the speed reducer to the pair of the output members, the rotor, the speed reducer, and the differential gear mechanism are disposed coaxially, the rotor, the speed reducer, and the differential gear mechanism are disposed in the stated order from the first axial side to the second axial side, the vehicle drive device includes:

the shaft member disposed so as to extend in the axial direction through an inner side of the speed reducer in the carrier radial direction;

a first supply portion that supplies the oil to the first oil receiving portion from the inner side in the carrier radial direction; and a second supply portion that supplies the oil to the second oil receiving portion from the inner side in the carrier radial direction, the first supply portion is provided in the shaft member, and the second supply portion is provided in the differential gear mechanism.

5. The vehicle drive device according to claim 1 wherein the drive source is a rotary electric machine including a rotor that rotates integrally with the shaft member, a pair of the output members is provided, the vehicle drive device includes a differential gear mechanism that distributes a driving force of the rotor transmitted via the speed reducer to the pair of the output members, the speed reducer includes a sun gear that meshes with the first gear portion, a first ring gear that meshes with the first gear portion, and a second ring gear that meshes with the second gear portion, the sun gear is connected to the rotor so as to rotate integrally with the rotor, the first ring gear is fixed to a non-rotary member, the second ring gear is connected to an input element of the differential gear mechanism, and assuming that a direction about the rotation axis of the planetary gear is a planetary circumferential direction, the first outer peripheral opening and the second outer peripheral opening are open at different positions in the planetary circumferential direction.

6. The vehicle drive device according to claim 2, wherein the drive source is a rotary electric machine including a rotor that rotates integrally with the shaft member, a pair of the output members is provided, the vehicle drive device includes a differential gear mechanism that distributes a driving force of the rotor transmitted via the speed reducer to the pair of the output members, the rotor, the speed reducer, and the differential gear mechanism are disposed coaxially, the rotor, the speed reducer, and the differential gear mechanism are disposed in the stated order from the first axial side to the second axial side, the vehicle drive device includes:

the shaft member disposed so as to extend in the axial direction through an inner side of the speed reducer in the carrier radial direction;

a first supply portion that supplies the oil to the first oil receiving portion from the inner side in the carrier radial direction; and a second supply portion that supplies the oil to the second oil receiving portion from the inner side in the carrier radial direction, the first supply portion is provided in the shaft member, and the second supply portion is provided in the differential gear mechanism.

7. The vehicle drive device according to claim 3, wherein the drive source is a rotary electric machine including a rotor that rotates integrally with the shaft member, a pair of the output members is provided, the vehicle drive device includes a differential gear mechanism that distributes a driving force of the rotor transmitted via the speed reducer to the pair of the output members, the rotor, the speed reducer, and the differential gear mechanism are disposed coaxially, the rotor, the speed reducer, and the differential gear mechanism are disposed in the stated order from the first axial side to the second axial side, the vehicle drive device includes:

the shaft member disposed so as to extend in the axial direction through an inner side of the speed reducer in the carrier radial direction;

a first supply portion that supplies the oil to the first oil receiving portion from the inner side in the carrier radial direction; and a second supply portion that supplies the oil to the second oil receiving portion from the inner side in the carrier radial direction, the first supply portion is provided in the shaft member, and the second supply portion is provided in the differential gear mechanism.

8. The vehicle drive device according to claim 2, wherein the drive source is a rotary electric machine including a rotor that rotates integrally with the shaft member, a pair of the output members is provided, the vehicle drive device includes a differential gear mechanism that distributes a driving force of the rotor transmitted via the speed reducer to the pair of the output members, the speed reducer includes a sun gear that meshes with the first gear portion, a first ring gear that meshes with the first gear portion, and a second ring gear that meshes with the second gear portion, the sun gear is connected to the rotor so as to rotate integrally with the rotor, the first ring gear is fixed to a non-rotary member, the second ring gear is connected to an input element of the differential gear mechanism, and assuming that a direction about the rotation axis of the planetary gear is a planetary circumferential direction, the first outer peripheral opening and the second outer peripheral opening are open at different positions in the planetary circumferential direction.

9. The vehicle drive device according to claim 3, wherein the drive source is a rotary electric machine including a rotor that rotates integrally with the shaft member, a pair of the output members is provided, the vehicle drive device includes a differential gear mechanism that distributes a driving force of the rotor transmitted via the speed reducer to the pair of the output members, the speed reducer includes a sun gear that meshes with the first gear portion, a first ring gear that meshes with the first gear portion, and a second ring gear that meshes with the second gear portion, the sun gear is connected to the rotor so as to rotate integrally with the rotor, the first ring gear is fixed to a non-rotary member, the second ring gear is connected to an input element of the differential gear mechanism, and assuming that a direction about the rotation axis of the planetary gear is a planetary circumferential direction, the first outer peripheral opening and the second outer peripheral opening are open at different positions in the planetary circumferential direction.

10. The vehicle drive device according to claim 4, wherein the drive source is a rotary electric machine including a rotor that rotates integrally with the shaft member, a pair of the output members is provided, the vehicle drive device includes a differential gear mechanism that distributes a driving force of the rotor transmitted via the speed reducer to the pair of the output members, the speed reducer includes a sun gear that meshes with the first gear portion, a first ring gear that meshes with the first gear portion, and a second ring gear that meshes with the second gear portion, the sun gear is connected to the rotor so as to rotate integrally with the rotor, the first ring gear is fixed to a non-rotary member, the second ring gear is connected to an input element of the differential gear mechanism, and assuming that a direction about the rotation axis of the planetary gear is a planetary circumferential direction, the first outer peripheral opening and the second outer peripheral opening are open at different positions in the planetary circumferential direction.

11. The vehicle drive device according to claim 6, wherein the drive source is a rotary electric machine including a rotor that rotates integrally with the shaft member, a pair of the output members is provided, the vehicle drive device includes a differential gear mechanism that distributes a driving force of the rotor transmitted via the speed reducer to the pair of the output members, the speed reducer includes a sun gear that meshes with the first gear portion, a first ring gear that meshes with the first gear portion, and a second ring gear that meshes with the second gear portion, the sun gear is connected to the rotor so as to rotate integrally with the rotor, the first ring gear is fixed to a non-rotary member, the second ring gear is connected to an input element of the differential gear mechanism, and assuming that a direction about the rotation axis of the planetary gear is a planetary circumferential direction, the first outer peripheral opening and the second outer peripheral opening are open at different positions in the planetary circumferential direction.

12. The vehicle drive device according to claim 7, wherein the drive source is a rotary electric machine including a rotor that rotates integrally with the shaft member, a pair of the output members is provided, the vehicle drive device includes a differential gear mechanism that distributes a driving force of the rotor transmitted via the speed reducer to the pair of the output members, the speed reducer includes a sun gear that meshes with the first gear portion, a first ring gear that meshes with the first gear portion, and a second ring gear that meshes with the second gear portion,
the sun gear is connected to the rotor so as to rotate integrally with the rotor,
the first ring gear is fixed to a non-rotary member,
the second ring gear is connected to an input element of the differential gear mechanism, and
assuming that a direction about the rotation axis of the planetary gear is a planetary circumferential direction,
the first outer peripheral opening and the second outer peripheral opening are open at different positions in the planetary circumferential direction.

* * * * *